June 3, 1930.  H. A. HICKS  1,761,560
DEVICE FOR COOLING AIRCRAFT ENGINES
Filed Dec. 7, 1929
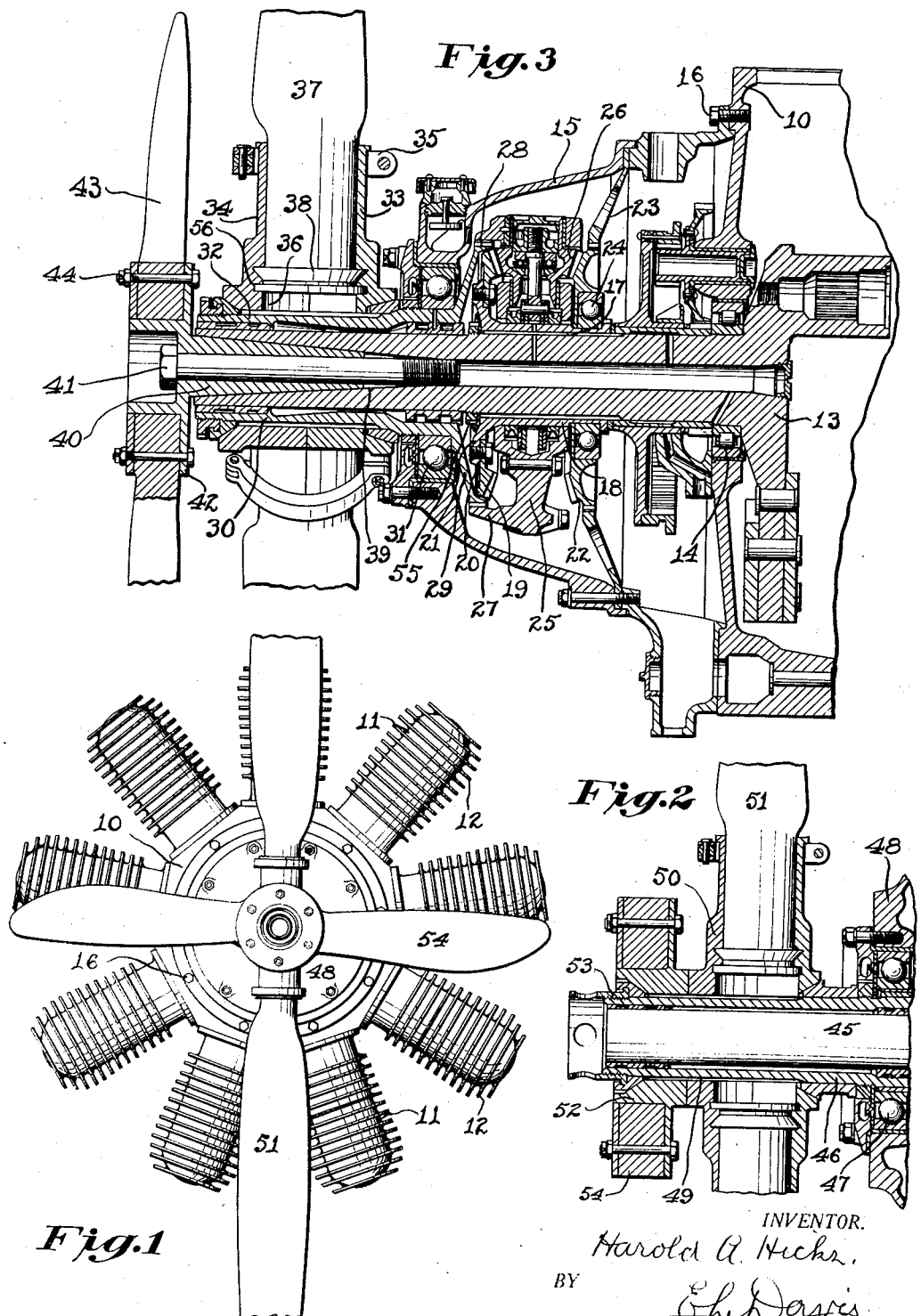
INVENTOR.
Harold A. Hicks.
BY
ATTORNEY.

Patented June 3, 1930

1,761,560

UNITED STATES PATENT OFFICE

HAROLD A. HICKS, OF DETROIT, MICHIGAN, ASSIGNOR TO FORD MOTOR COMPANY, OF DEARBORN, MICHIGAN, A CORPORATION OF DELAWARE

DEVICE FOR COOLING AIRCRAFT ENGINES

Application filed December 7, 1929. Serial No. 412,522.

The object of my invention is to provide a device for cooling aircraft engines of simple, durable, and inexpensive construction.

A further object of my invention is to provide a device for cooling aircraft engines especially adapted for use with air-cooled radial type engines having a reduction gear driven propeller.

In the operation of large transport airplanes, dirigibles and other comparatively slow aircraft, it has been found more efficient to provide a reduction gearing between the propeller and the airplane engine than to couple the propeller directly to the engine. With such reduction gearing, a given engine will swing a much larger propeller than if the propeller were driven at crank shaft speed. The aerodynamics of the geared down propeller will not be gone into here, as it forms no part of my invention and is merely brought up to show an apt location where my improved device may be used.

The ordinary radial air-cooled engine is designed to swing a propeller at crank shaft speed. Such propeller is ordinarily about twice the overall diameter of the engine and travelling at crank shaft speed, creates a relatively small slip stream, the center portion of which is directed on the engine cylinders. These engines are as yet provided with only sufficient radiation fins to keep the engine at the proper operating temperature when used with the ordinary propeller.

When a reduction gearing between the engine crank shaft and the propeller is used thereby driving a much larger propeller at a slower speed, the engine cylinders are improperly cooled. Numerous attempts have been made to so shape the shanks or hub portions of these large propellers so that they will provide sufficient air for cooling the engines, but these attempts have been as yet unsuccessful. The reduced speed of operation with the abnormal thickness of the shank required at this point prevents designing the propeller to give a sufficient flow of air directed on the engine cylinders.

It will be understood that the lead of a one to two geared down propeller is approximately twice that of a direct driven propeller so that the faces of the blades close to the axis are substantially parallel to the axis. Further, the speed of such propeller being only half that of the direct driven propeller, operates these flat faces so that little or no propulsion of air is obtained from the center portion of the propeller. In fact, this portion acts like a centrifugal fan drawing the air from the hub portion and propelling it out radially into the slip stream. This suction from the hub portion tends to draw the air forwardly between the engine cylinders which counteracts the normal air current produced by the forward motion of the plane.

When such a propeller is used tests have shown that the air is practically stagnate around the engine cylinders so that little or no cooling effect is obtained. My improved device is primarily adapted to be used in conjunction with such a geared down propeller, and is so designed that a stream of air will be directed on the engine cylinders so that the engine may be operated under normal conditions.

Still a further object of my invention is to provide in connection with a radial air-cooled airplane engine and reduction gear driven propeller, an auxiliary propeller directly connected to the engine crank shaft the purpose of which is to cool the engine cylinders.

With these and other objects in view, my invention consists in the arrangement, construction, and combination of the various parts of my improved device, as described in the specifications, claimed in my claims, and illustrated in the accompanying drawings, in which:

Figure 1 shows a front elevation of an airplane engine having my improved cooling device mounted thereon.

Figure 2 shows a vertical central sectional view taken through the airplane propeller and cooling device, shown in Figure 1, and Figure 3 shows a vertical central sectional view through the reduction gearing of an airplane engine having a three bladed propeller driven thereby and having my improved cooling device directly connected to the engine crank shaft.

Referring to the accompanying drawings,

I have used the reference numeral 10 to indicate generally the crank case of an airplane engine having a plurality of radially extending cylinders 11 secured thereto. These cylinders are provided with cooling ribs or fins 12 formed thereon in the conventional manner. Figure 3 shows a structure having a crank shaft 13 rotatably mounted on roller bearings 14 which are housed in the side of the crank case 10. The forward end of the crank shaft 13 extends outwardly through a reduction gearing housing 15 which is fastened by means of bolts 16 to the forward face of the crank case 10.

The intermediate portion of the crank shaft 13 within the housing 15 is splined at 17 and is provided with a correspondingly splined sleeve 18 secured thereon by means of a spanner nut 55. A bevel ring gear 19 is bolted at 20 to a radial flange 21 which extends from the forward end of the sleeve 18. The gear 19 is thus at all times driven by the crank shaft 13. A second bevel gear 22 is secured to a stationary disk member 23 which is fastened in the housing 15 and a ball bearing 24 is mounted in a suitable recess in the center of this bevel gear 22 to support the gear on the rear end of the sleeve 18.

A planet gear carrier 25 is rotatably mounted on the sleeve 18 between the flange 21 and the ball bearing 24 and is provided with a plurality of bevel planet gears 26, rotatably mounted thereon in suitable bearings, in position to mesh with the gears 19 and 22. A sleeve 27 extending forwardly from the planet carrier 25 is provided with suitable splines 28 which co-act with similar splines formed on the outer edge of a disk 29 so that when the carrier is rotated this disk will also be rotated. The disk 29 is formed integrally with the rear end of a driving sleeve 30 which is rotatably mounted in suitable bearings on the forward end of the crank shaft 13. A ball bearing 31 mounted in the forward end of the housing 15 supports the rear end of the sleeve 30 which in turn supports the forward end of the crank shaft 13.

It may thus be seen that when the crank shaft 13 is rotated the sleeve 18 and bevel gear 19 will also rotate at the same speed. The planet gear carrier 25 having the bevel pinions 26 mounted thereon will thus be rotated at one half the speed of the crank shaft and will, of course, rotate the sleeve 30 at this reduced speed.

The outer surface of the sleeve 30 is splined at 32 to co-act with corresponding splines on a propeller hub unit. This propeller hub unit consists of a pair of complementary hub members 33 and 34, respectively, which are secured together by means of clamp members 35. The hub unit, illustrated in Figure 3, is provided with three radial bores 36 designed to receive three like propeller blades 37, one in each bore. Flanges 38, extending from the inner end of the propeller blades 37 co-act with grooves 56 in the bores 36 to restrain these propeller blades from flying out of the hub member due to centrifugal force when the latter is rotated.

The forward end of the crank shaft 15 is ordinarily provided with a tapered bore 39. A correspondingly tapered shank 40 is secured in this bore 39 by means of a bolt 41 which extends axially through the shank into the crank shaft. The forward end of the shank 40 has a radially extending hub 42 formed integrally therewith to which an auxiliary propeller is secured by means of bolts 44. The propeller 43 may be of two or more blades, three blades being shown in Figure 3, and should preferably be of substantially the same diameter as the airplane engine. It may thus be seen that when the engine is in operation, the propeller 37 will be driven at one half engine speed through the aforementioned speed reducing mechanism and that the auxiliary propeller 43 will be driven at a much faster speed, that is, at crank shaft speed, it being secured directly to the crank shaft.

The described gearing is of the planetary type but it may be found desirable to provide a spur gear reduction. In such cases, the auxiliary propeller may be operated at engine speed or if the engine be extremely difficult to cool, as the double row type radial engines sometimes are, the auxiliary propeller may be driven through an over drive gearing to produce a still greater cooling effect.

Referring to Figure 1 and 2, an auxiliary propeller directly connected to the reduced speed propeller is shown. While this structure is not as effective as the cooling device shown in Figure 3, it possesses many advantages over the ordinary method of cooling such motors, and it may be desirable to use this type of cooling device in the northern districts where the slow speed propeller allows the motor to run too hot and where the device shown in Figure 3 cools the motor below its efficient operating temperature.

An engine crank shaft 45 having sleeve 46 rotatably mounted thereon, is supported in the forward end of a reduction gearing housing 48 by bearings 47. The reduction gearing used with this installation has not been shown in this view, as it is similar to the gearing shown in Figure 3, and because the type of gearing is not important to the the functioning of the device. The outer surface of the sleeve 46 is splined at 49 to co-act with corresponding splines machined in a propeller hub unit 50. This hub unit 50 is arranged to hold two propeller blades 51 therein in a manner similar to the propeller hub members 33 and 34.

An auxiliary propeller hub 52 is mounted on the sleeve 46 forwardly of the hub unit 50, both of these members being secured on this sleeve by means of a nut 53. A two bladed auxiliary propeller 54, of a diameter substantially the same as the overall diameter of the engine, is fastened to the hub member 52 so that its blades are perpendicular to the propeller blades 51. In this structure both the propeller 51 and the auxiliary propeller 54 revolve at a reduced speed, but the air stream created by the auxiliary propeller 54 being of a much smaller diameter than that created by the main propeller 51, flows directly against the engine cylinders. Although the air flow created by this auxiliary propeller 54 is not as great as that created by the auxiliary propeller 43 in Figure 3, still it is sufficient to maintain the engine at a proper working temperature under favorable conditions.

It may be found advantageous to use a water cooled engine in place of the type shown herein, and in such cases, a radiator may be provided having an effective area substantially equaling the area of the slip stream produced by the auxiliary propeller at the plane of intersection therewith. Further, the aforementioned device may be mounted as a pusher type propeller and the air drawn between the engine cylinders instead of being blown upon them.

Many advantages arise through the use of my improved device and it may be well to mention that with this device a large slow speed propeller may be used for efficiently propelling transport planes, and still the engine can be maintained at its proper operating temperature. Further, the radial type air-cooled engine with which it has formerly been possible to efficiently use only a direct driven high speed propeller may be used to efficiently operate a large slow speed propeller and to thus gain greater lifting power when installed on certain types of airplanes. Still a further advantage results because there are no friction producing parts or parts likely to get out of order. The auxiliary propeller being used only for cooling the engine may be extremely light in weight.

Some changes may be made in the arrangement, construction, and combination of the various parts of my improved device without departing from the spirit of my invention, and it is my intention to cover by my claims such changes as may reasonably be included within the scope thereof.

I claim as my invention:

1. In a device for cooling aircraft engines, a relatively large slow speed propeller driven through a speed reducing mechanism by said engine, an auxiliary propeller driven by said engine, and engine heat dissipating means disposed adjacent to said auxiliary propeller having an effective area substantially equaling the area of the auxiliary propeller slip stream at the plane of intersection.

2. In a device for cooling aircraft engines, a relatively large slow speed propeller driven through a speed reducing mechanism by said engine, an auxiliary propeller driven at engine speed by said engine, and engine heat dissipating means disposed adjacent to said auxiliary propeller having an effective area substantially equaling the area of the auxiliary propellers slip stream at the plane of intersection.

3. In a device for cooling aircraft engines, a relatively large slow speed propeller driven through a speed reducing mechanism by said engine, an auxiliary propeller driven by said engine through said speed reducing mechanism, and engine heat dissipating means disposed adjacent to said auxiliary propeller having an effective area substantially equaling the area of the auxiliary propellers slip stream at the plane of intersection.

4. In a device for cooling aircraft engines, an air-cooled radial type engine, a relatively large slow speed propeller driven through a speed reducing mechanism by said engine, and an auxiliary propeller of a diameter substantially equaling the diameter of said engine driven by said engine.

5. In a device for cooling aircraft engines, an air-cooled radial type engine, a relatively large slow speed propeller driven through a reduction gearing by said engine, and an auxiliary propeller of a diameter substantially equaling the diameter of said engine coupled directly to the crank shaft of said engine.

6. In a device for cooling aircraft engines, an air-cooled radial type engine, a reduction gearing operatively connected to said engine, a propeller operatively connected to said reduction gearing so as to be driven thereby at a reduced speed, and an auxiliary propeller of a diameter substantially equaling the diameter of said engine operatively connected to said reduction gearing in a position perpendicular to said first mentioned propeller.

7. In a device for cooling aircraft engines, an air-cooled radial type engine, a planetary reduction gearing operatively connected to said engine, the engine crank shaft extending forwardly through said gearing, a propeller operatively connected to the driven member of said gearing, and an auxiliary propeller of diameter substantially equaling the diameter of said engine connected to the forward end of said crank shaft.

November 29, 1929.

HAROLD A. HICKS.